US010423868B2

(12) United States Patent
Shi et al.

(10) Patent No.: US 10,423,868 B2
(45) Date of Patent: Sep. 24, 2019

(54) EMBEDDING A REMOVABLE BARCODE INTO AN IMAGE

(71) Applicant: INTERNATIONAL BUSINESS MACHINES CORPORATION, Armonk, NY (US)

(72) Inventors: Wenzhe Shi, Beijing (CN); Xiaoyu Li, Beijing (CN); Ziying Xin, Beijing (CN); Li Zhang, Beijing (CN); Wenya Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

(21) Appl. No.: 15/416,110

(22) Filed: Jan. 26, 2017

(65) Prior Publication Data
US 2018/0211390 A1    Jul. 26, 2018

(51) Int. Cl.
*G06K 19/06*    (2006.01)
*G06T 5/00*    (2006.01)
*G06T 11/60*    (2006.01)

(52) U.S. Cl.
CPC .  *G06K 19/06103* (2013.01); *G06K 19/06037* (2013.01); *G06T 5/008* (2013.01); *G06T 11/60* (2013.01); *G06T 2207/10024* (2013.01)

(58) Field of Classification Search
CPC ........ G06K 19/06037; G06K 19/06103; G06T 11/60; G06T 5/008; G06T 2207/10024
See application file for complete search history.

(56) References Cited

U.S. PATENT DOCUMENTS

| 7,108,186 | B2 | 9/2006 | Lubow |
| 8,550,366 | B2 | 10/2013 | Myodo et al. |
| 2009/0159658 | A1 | 6/2009 | Cheung et al. |
| 2012/0113287 | A1* | 5/2012 | Johnson ................ H04N 5/217 348/222.1 |
| 2013/0228629 | A1 | 9/2013 | Fan et al. |
| 2013/0228630 | A1* | 9/2013 | Fan .................. G06K 19/06103 235/494 |
| 2018/0139429 | A1* | 5/2018 | Park ........................ H04N 9/77 |
| 2018/0336669 | A1* | 11/2018 | Mertens ................. G06T 5/007 |

FOREIGN PATENT DOCUMENTS

WO    WO20165017970 A1    2/2015

OTHER PUBLICATIONS

Bachkar, Shraddha et al., "QR Images: An Automatic Method to Embed QR Codes in to Color Images," International Journal of Computer Trends and Technology (IJCTT), vol. 23, No. 2, May 2015, pp. 92-95.

\* cited by examiner

*Primary Examiner* — Edward Park
(74) *Attorney, Agent, or Firm* — Margaret McNamara, Esq.; Blanche E. Schiller, Esq.; Heslin Rothenberg Farley & Mesiti P.C.

(57)    ABSTRACT

Removing an embedded barcode in an image. A barcode-embedding area in an image is acquired. Pixels in the barcode-embedding area can be changed from a RGB color space to a color space with a luminance component. The luminance values of the pixels can be determined on a dark side or a light side. The luminance values of the pixels on the dark side or the light side can be mapped to luminance values falling into a whole range of a luminance interval. The pixels in the barcode-embedding area can be changed from the color space with the luminance component to the RGB color space.

15 Claims, 6 Drawing Sheets

EMBEDDING A REMOVABLE BARCODE INTO AN IMAGE

BACKGROUND

One or more aspect of the present invention relate generally to embedding a removable barcode into an image.

A barcode is often used to store information of a digital image, which includes a linear barcode (e.g., one-dimensional (1D) barcode) and a matrix barcode (e.g., two-dimensional (2D) barcode). The barcode can consist of a combination of black portions and white portions. Herein, the black portions are referred to as code areas, and the white portions are referred to as background areas. The barcode can be embedded into an image. The barcode can contain a copy prevention code and/or tracking information of the image. When the barcode is scanned or read by an appropriate electronic reader device, the copy prevention code and/or the tracking information of the image can be extracted. The copy prevention code can be used to determine whether copying of the image can be allowed, and the tracking information may contain useful information related to the identity of the owner and/or creation time of the image. However, if someone wants to use the original image, it is not easy to remove the barcode and restore the barcode-embedding area of the image for the barcode-embedding area on the image has been destroyed by the barcode.

SUMMARY

Shortcomings of the prior art are overcome and additional advantages are provided through the provision of a computer-implemented method. The method includes, for instance, acquiring a barcode-embedding area in an image, and changing pixels in the barcode-embedding area from a red, green, blue (RGB) color space to a color space with a luminance component. The method further includes determining the luminance values of the pixels are on a dark side or a light side, and mapping the luminance values of the pixels on the dark side or the light side to luminance values falling into a whole range of a luminance interval. The pixels in the barcode-embedding area are changed from the color space with the luminance component to the RGB color space.

Computer program products and systems relating to one or more aspects are also described and claimed herein.

Additional features and advantages are realized through the techniques described herein. Other embodiments and aspects are described in detail herein and are considered a part of the claimed aspects.

It is to be understood that the Summary is not intended to identify key or essential features of embodiments of the present disclosure, nor is it intended to be used to limit the scope of aspects of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of aspects of the present disclosure will become more apparent, wherein the same reference generally refers to the same components in the embodiments of the present disclosure.

DETAILED DESCRIPTION

Aspects of the present disclosure will now be described with reference to some example embodiments. It is to be understood that these embodiments are described only for the purpose of illustration and to help those skilled in the art to understand and implement aspects of the present disclosure, without suggesting any limitations as to the scope of the disclosure. The aspects of the disclosure described herein can be implemented in various manners, including other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
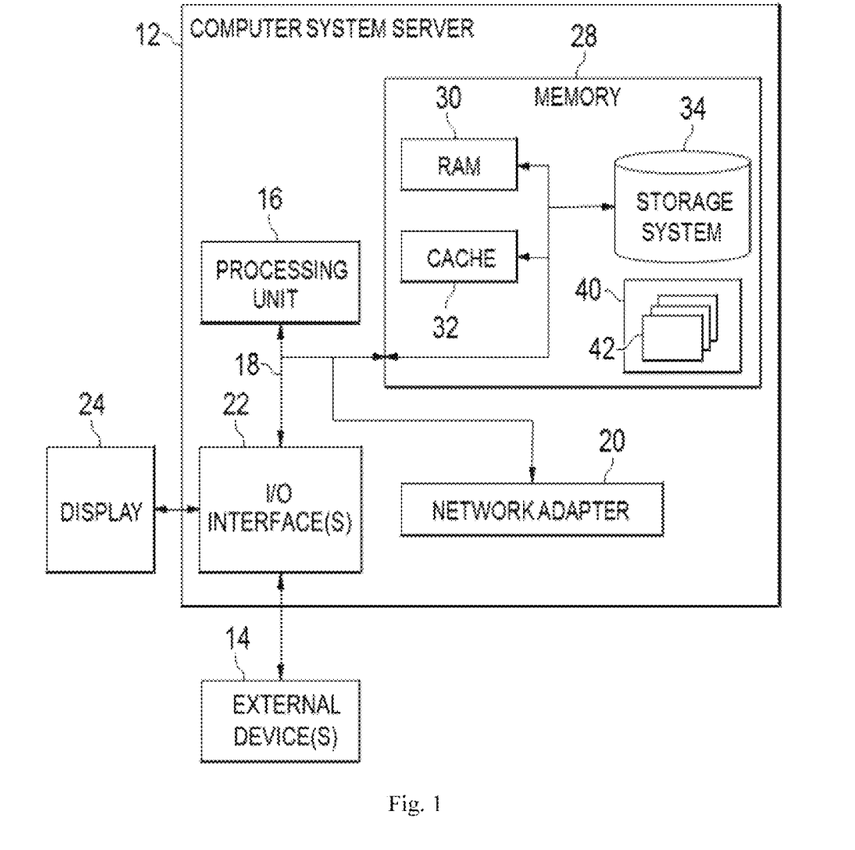
FIG. 1 is a block diagram of an electronic device suitable for implementing embodiments of the present disclosure.

Reference is first made to FIG. 1, in which an example electronic device or computer system/server 12 which is applicable to implement embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device, such as a keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

One solution for barcode removal uses image processing software, such as Photoshop®, to realize hierarchical storage for an image, i.e., a barcode is stored in one layer while the image is stored in another layer. By this way, the image cannot be destroyed by the barcode, so it is easy to remove the barcode and restore the original image whenever needed. However, a Photoshop® file format is not compatible with general picture processing software. Users have to find Photoshop® software to realize barcode embedding and original image restoring. Therefore, there is a need to embed a removable barcode into an image with a general picture format.

In order to address the above and other potential problems, embodiments of the present disclosure provide an effective solution for removing an embedded barcode in an image. The following will be explained with reference to FIG. 2.

Figure 2:
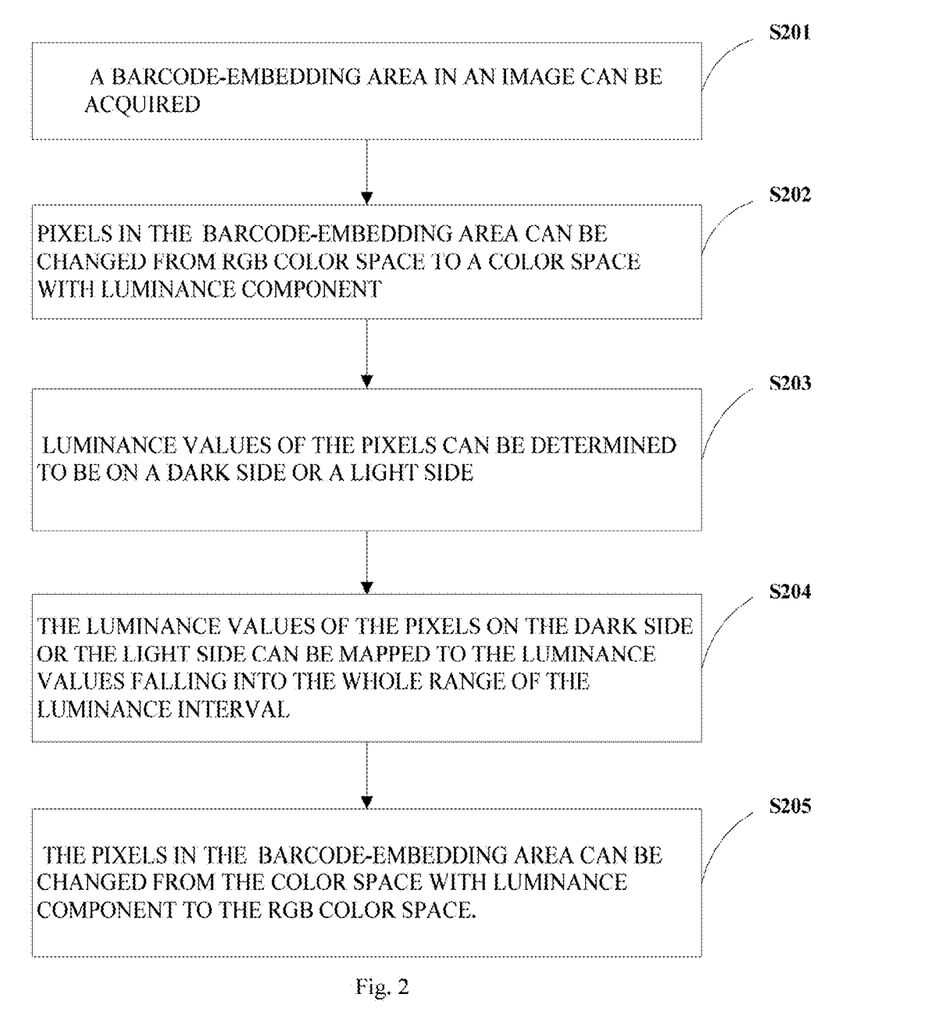
FIG. 2 is a flow diagram depicting one example of a method for removing an embedded barcode in an image.

FIG. 2 shows one example of a method for removing an embedded barcode in an image, the method includes, for instance: in step S201, a barcode-embedding area in an image can be acquired. In step S202, pixels in the barcode-embedding area can be changed from a RGB (Red, Green, Blue) color space to a color space with a luminance component. In step S203, luminance values of the pixels can be determined to be on a dark side or a light side. In step S204, the luminance values of the pixels on the dark side or the light side can be mapped to the luminance values falling into the whole range of the luminance interval. In step S205, the pixels in the barcode-embedding area can be changed from the color space with the luminance component to the RGB color space.

Figure 3:
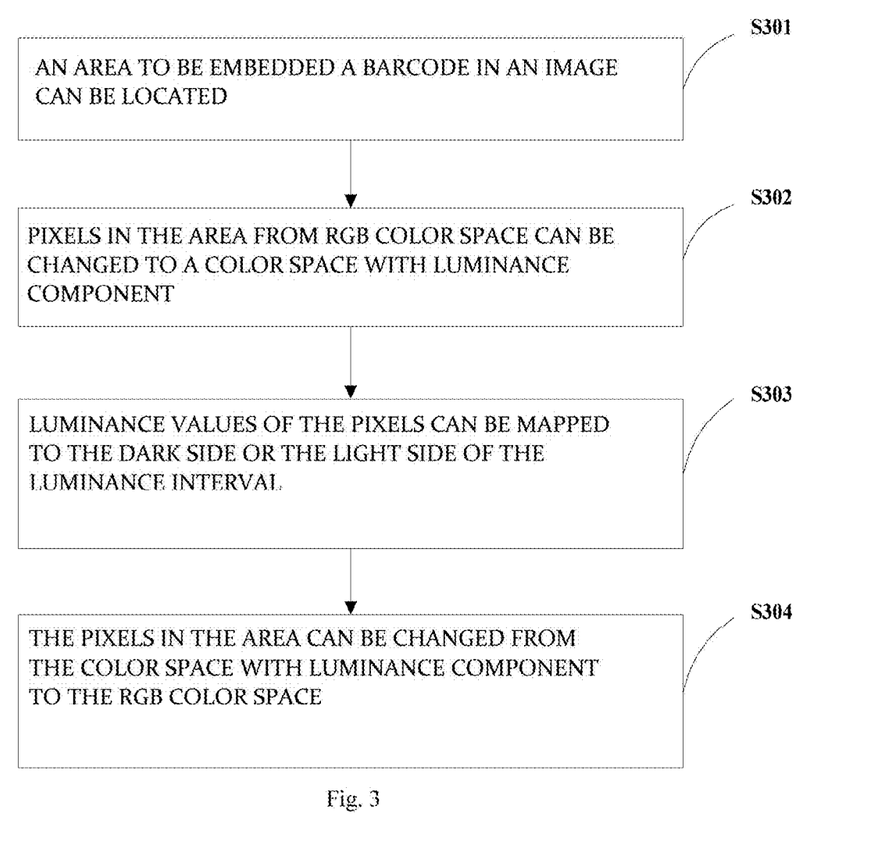
FIG. 3 is a flow diagram depicting one example of a method for embedding a barcode in an image.

In step S201, a barcode-embedding area in an image can be acquired. An embodiment of this disclosure provides a method for embedding a removable barcode into an image. For example, FIG. 3 shows one example of a method for embedding a barcode into an image. The method includes, for instance: In step S301, an area to be embedded a barcode in an image can be located. In step S302, pixels in the area can be changed from a RGB color space to a color space with a luminance component. In step S303, luminance values of the pixels can be mapped to the dark side or the light side of a luminance interval based on color information of the barcode corresponding to the pixels. In step S304, the pixels in the area can be changed from the color space with the luminance component to the RGB color space.

Those skilled in the art may understand that the color space with the luminance components in S202 and S302 may comprise any currently known or future developed color spaces with a luminance component. The currently known color spaces with a luminance component include, but are not limited to, YUV, YIQ and HSL, and so on.

In step S303, the purpose of mapping luminance values of the pixels to the dark side or the light side of the luminance interval based on color information of the barcode corresponding to the pixels is to form the barcode with color contrasts which can be identified correctly by a barcode reader. In one example, the mapping the luminance values of the pixels to the dark side or the light side of the luminance interval based on color information of the barcode corresponding to the pixels further includes, for instance: for each pixel in the area, in responding to the corresponding barcode pixel being black, luminance values of the pixel can be mapped to the dark side of the luminance interval, and in responding to the corresponding barcode pixel being white, luminance values of the pixel can be mapped to the light side of the luminance interval.

According to an embodiment of the present disclosure, the mapping of luminance values of the pixels to the dark side or the light side of the luminance interval may further include, for instance: in response to a plurality of luminance values of the pixels mapping to one luminance value in the dark side or the light side of the luminance interval, the plurality of luminance values of the pixels can be differentiated by correction codes. In one aspect of the method for removing an embedded barcode in an image according to an embodiment of this disclosure, the correction codes can be used to revise the luminance values. For example, in step S204, the luminance values falling into the whole range of the luminance interval means the luminance values are not just distributed in the dark side or the light side of the luminance interval but can be distributed in the whole range of the luminance interval. In one example, the mapping of the luminance values of the pixels on the dark side or the light side to the luminance values falling into the whole range of the luminance interval further includes that the luminance values falling into the whole range of the luminance interval can be revised with the correction codes.

The following shows an example of embedding and removing a barcode in an image according to an embodiment of present disclosure. Those skilled in the art may understand that this example is only illustrative and is not intended to limit the scope of aspects of the disclosure described herein.

For simplification of description, assume area R is to be embedded with a barcode, which includes four pixels A, B, C and D. Suppose that pixels A, B will be covered by a black colored barcode and pixels C, D will be covered by a white colored barcode. The following shows the R, G and B components of four pixels A, B, C and D in the RGB color space:

A: (R=10, G=10, B=10)
B: (R=200, G=200, B=232)
C: (R=0, G=40, B=30)
D: (R=128, G=130, B=120)

According to an embodiment of present disclosure, the YUV color space can be selected as the color space with a luminance component, in which the YUV color space defines a color space in terms of one luminance component (Y) and two chrominance components (UV). Pixels A, B, C and D can be changed from the RGB color space to the YUV color space. The following shows one example of a transformation formula (1) from the RGB color space to the YUV color space. Those skilled in the art may understand that the transformation formula (1) is only illustrative and is not intended to limit the scope of aspects of the disclosure described herein.

$$Y=0.299*R+0.587*G+0.114*B$$

$$U=-0.168736*R-0.331264*G+0.5*B+128$$

$$V=0.5*R-0.418688*G-0.081312*B+128 \quad (1)$$

I: After the transformation formula (1) is applied, pixels A, B, C and D in the RGB color space can be transformed to pixels $A_1$, $B_1$, $C_1$ and $D_1$ in the YUV color space with Y, U and V components, in which pixels $A_1$, $B_1$, $C_1$ and $D_1$ can be obtained as follows:

$A_1$: (Y=10, U=128, V=128)
$B_1$: (Y=204, U=144, V=125)
$C_1$: (Y=27, U=130, V=109)
$D_1$: (Y=128, U=123, V=128)

II: Since pixels A, B can be covered by a black colored barcode and pixels C, D can be covered by a white colored barcode, the luminance values Y of pixels A, B can be mapped to a dark side and the luminance values Y of pixels C, D can be mapped to a light side. By this way, a barcode can be formed in the area R. According to an embodiment of present disclosure, luminance values ranging from 0 to 255 can be divided into 4 sections (0-63), (64-127), (128-191), (192-255), in which section (0-63) can be regarded as the dark side and section (192-255) can be regarded as the light side. Then, the luminance values Y of pixels A, B can be mapped to section (0-63) by replacing the luminance values Y of pixels A, B with int (Y/4), wherein int (Y/4) can represent an integer part of Y divided by 4, and the luminance values Y of pixels C, D can be mapped to section (192-255) by replacing the luminance values Y of pixels C, D with int (Y/4)+192. The above luminance values dividing method is only illustrative and is not intended to limit the scope of aspects of the disclosure described herein. Those skilled in the art may understand that the embodiments of the present invention are not intended to limit a method for mapping the luminance values of the pixels to the dark side or the light side of the luminance interval. Those skilled in the art may select any appropriate luminance values dividing method based on a concrete application environment, as long as the formed barcode can be identified correctly by the barcode reader after mapping.

$A_1$: int (10/4)=2 remainder (10/4)=2
$B_1$: int (204/4)=51 remainder (204/4)=0
$C_1$: int (27/4)=6 remainder (27/4)=3
$D_1$: int (128/4)=32 remainder (128/4)=0

III: The following shows four pixels $A_2$, $B_2$, $C_2$ and $D_2$ with Y, U and V components in the YUV color space after mapping:

$A_2$: (Y=2, U=128, V=128)
$B_2$: (Y=51, U=144, V=125)
$C_2$: (Y=198, U=130, V=109)
$D_2$: (Y=224, U=123, V=128)

Pixels A, B, C and D are transformed from the YUV color space to the RGB color space. The following shows one example of a transformation formula (2) to change a pixel from the RGB color space to the YUV color space. A person skilled in the art may understand that the transformation formula (2) is only illustrative and is not intended to limit the scope of spects of the disclosure described herein.

$$R=Y+1.402*(V-128)$$

$$G=Y-0.34414*(U-128)-0.71414*(V-128)$$

$$B=Y+1.772*(U-128) \quad (2)$$

IV: After the transformation formula (2) is applied, pixels $A_2$, $B_2$, $C_2$ and $D_2$ can be transformed from the YUV color space to the RGB color space, and finally get pixels $A_3$, $B_3$, $C_3$ and $D_3$ embedded with a barcode in the RGB color space:

$A_3$: (R=2, G=2, B=2)
$B_3$: (R=47, G=48, B=79)
$C_3$: (R=171, G=211, B=202)
$D_3$: (R=224, G=226, B=215)

According to an embodiment of the present disclosure, the above removing method described in FIG. 2 can be applied to the four pixels $A_3$, $B_3$, $C_3$ and $D_3$ to remove the barcode in the image.

V: After the transformation formula (1) is applied, pixels $A_3$, $B_3$, $C_3$ and $D_3$ in the RGB color space can be transformed to pixels $A_4$, $B_4$, $C_4$ and $D_4$ in the YUV color space with Y, U and V components:

$A_4$: (Y=2, U=128, V=128)
$B_4$: (Y=51, U=144, V=125)
$C_4$: (Y=198, U=130, V=109)
$D_4$: (Y=224, U=123, V=128)

VI: The luminance values Y of the pixels $A_4$ and $B_4$ can be determined to be on the dark side and the luminance values Y of the pixels $C_4$ and $D_4$ in the area can be determined to be on light side. For example, if Y<=63, then Y can be replaced with Y*4; and if Y>=192, then Y can be replaced with (Y-192)*4. The following shows pixels $A_5$, $B_5$, $C_5$ and $D_5$ with the replaced Y according to the above example mapping algorithm.

$A_5$: (Y=8, U=128, V=128)
$B_5$: (Y=204, U=144, V=125)
$C_5$: (Y=24, U=130, V=109)
$D_5$: (Y=128, U=123, V=128)

VII: After the transformation formula (2) is applied, pixels $A_5$, $B_5$, $C_5$ and $D_5$ can be transformed to $A_6$, $B_6$, $C_6$ and $D_6$ in the RGB color space:

$A_6$: (R=8, G=8, B=8) A: (R=10, G=10, B=10)
$B_6$: (R=200, G=201, B=232) B: (R=200, G=200, B=232)
$C_6$: (R=0, G=37, B=28) C: (R=0, G=40, B=30)
$D_6$: (R=128, G=130, B=119) D: (R=128, G=130, B=120)

It can be seen that pixels $A_6$, $B_6$, $C_6$ and $D_6$ are close to the original pixels A, B, C, and D. People's eyes cannot distinguish the difference between the pixels $A_6$, $B_6$, $C_6$ and $D_6$ and original pixels A, B, C and D. By applying the above embedding method, as an example, to the pixels in the area to be embedded with a barcode, the image of the area can be restored whenever desired.

It can be seen that pixels $A_6$, $B_6$, $C_6$ and $D_6$ are close to the original pixels A, B, C and D. People's eyes cannot distinguish the difference between the pixels $A_6$, $B_6$, $C_6$ and $D_6$ and original pixels A, B, C and D. After the above barcode embedding/removing method is applied to the area R, the image of the area R can be restored whenever desired.

According to an embodiment of the present disclosure, the mapping luminance values of the pixels to the dark side or the light side of the luminance interval further includes: in response to a plurality of luminance values of the pixels being mapped to a luminance value in the dark side or the light side of the luminance interval, the plurality of luminance values of the pixels can be differentiated by correction codes. Specifically, according to an embodiment of the present disclosure, binary representation of the remainders of the luminance values Y in II above can be used as the correction codes to revise the LSB (least significant bit) of the R and B components of pixels $A_3$, $B_3$, $C_3$ and $D_3$ in IV above.

remainder=2 (10)
remainder=0 (00)
remainder=3 (11)
remainder=0 (00)
Correction codes of $A_3$: (10)
Correction codes of $B_3$: (00)
Correction codes of $C_3$: (11)
Correction codes of $D_3$: (00)

VIII: The LSB of the R and B components of pixels $A_3$, $B_3$, $C_3$ and $D_3$ in IV above can be revised by the correction codes of pixels $A_3$, $B_3$, $C_3$ and $D_3$. The following shows, e.g., the binary representation of the R and B components of pixels $A_3$, $B_3$, $C_3$ and $D_3$, specifically, the LSB of the R component of pixels $A_3$, $B_3$, $C_3$ and $D_3$ can be replaced with the bit next to the LSB of the correction codes of pixels $A_3$, $B_3$, $C_3$ and $D_3$, respectively, and the LSB of the B component of pixels $A_3$, $B_3$, $C_3$ and $D_3$ can be replaced with the LSB of the correction codes of pixels $A_3$, $B_3$, $C_3$ and $D_3$, respectively. For example, the LSB of the R component of pixels $A_3$ (0) can be replaced with the bit next to the LSB of the correction codes of pixels $A_3$ (1), and the LSB of the B of pixels $A_3$ (0) can be replaced with the bit next to the LSB of the correction codes of pixels $A_3$ (0), so the R component of pixel $A_3$ can be changed from (10) to (11) and the B component of pixel $A_3$ can be kept unchanged. The following shows one example of the revised pixels $A_7$, $B_7$, $C_7$ and $D_7$:

$A_3$: R(1<u>0</u>) B(1<u>0</u>)---->R(1<u>1</u>) B(1<u>0</u>)
$B_3$: R(10111<u>1</u>) B(100111<u>1</u>)---->R(10111<u>0</u>) B(100111<u>0</u>)
$C_3$: R(1010101<u>1</u>)B(1100101<u>0</u>)---->R(1010101<u>1</u>) B(1100101<u>1</u>)
$D_3$: R(1110000<u>0</u>) B(1101011<u>1</u>)---->R(1110000<u>0</u>) B(1101011<u>0</u>)

$A_7$: (R=3, G=2, B=2)
$B_7$: (R=46, G=48, B=78)
$C_7$: (R=171, G=211, B=203)
$D_7$: (R=224, G=226, B=214)

IX: After the transformation formula (1) being applied, pixels $A_7$, $B_7$, $C_7$ and $D_7$ in the RGB color space can be transformed to pixels $A_8$, $B_8$, $C_8$ and $D_8$ in the YUV color space:

$A_8$: (Y=2, U=128, V=129)
$B_8$: (Y=51, U=143, V=125)
$C_8$: (Y=198, U=131, V=109)
$D_8$: (Y=224, U=122, V=128)

X: The luminance values Y of the pixels $A_8$ and $B_8$ can be identified to be on the dark side and the luminance values Y of the pixels $C_8$ and $D_8$ in the area can be identified to be on the light side. If Y<=63, then Y can be replaced with Y*4; and if Y>=192, then Y can be replaced with (Y-192)*4. The following shows example pixels $A_9$, $B_9$, $C_9$ and $D_9$ with the replaced luminance values Y according to one example of the above mapping algorithm:

$A_9$: (Y=8, U=128, V=129)
$B_9$: (Y=204, U=143, V=125)
$C_9$: (Y=24, U=131, V=109)
$D_9$: (Y=128, U=122, V=128)

In one aspect of the method for removing an embedded barcode in an image according to an embodiment of the present disclosure, the correction codes can be used to revise the luminance values, e.g., in step S204, in which the mapping of the luminance values of the pixels on the dark side or the light side to the luminance values falling into the whole range of the luminance interval can further include revising the luminance values falling into the whole range of the luminance interval with the correction code.

According to an embodiment of present disclosure, the luminance values Y of the pixels can be revised by the correction codes to make the restored image closer to the original image.

XI: The remainders in II above can be regarded as the correction codes to revise the luminance values Y of the pixels $A_9$, $B_9$, $C_9$ and $D_9$. For example, the luminance values Y of the pixels $A_9$, $B_9$, $C_9$ and $D_9$ can be replaced with (Y+ the corresponding remainder). The following shows the revised pixels $A_{10}$, $B_{10}$, $C_{10}$ and $D_{10}$.

$A_{10}$: (Y=10, U=128, V=129) remainder=2
$B_{10}$: (Y=204, U=143, V=125) remainder=0
$C_{10}$: (Y=27, U=131, V=109) remainder=3
$D_{10}$: (Y=128, U=122, V=128) remainder=0

After the transformation formula (2) being applied, pixels $A_{10}$, $B_{10}$, $C_{10}$ and $D_{10}$ can be transformed to pixels $A_{11}$, $B_{11}$, $C_{11}$ and $D_{11}$ from the YUV color space to the RGB color space:

$A_{11}$: (R=11, G=9, B=10) A: (R=10, G=10, B=10)
$B_{11}$: (R=200, G=201, B=231) B: (R=200, G=200, B=232)
$C_{11}$: (R=0, G=40, B=32) C: (R=0, G=40, B=30)
$D_{11}$: (R=128, G=130, B=117) D: (R=128, G=130, B=120)

It can be seen that pixels $A_{11}$, $B_{11}$, $C_{11}$ and $D_{11}$ are closer to the original pixels A, B, C and D than pixels $A_6$, $B_6$, $C_6$ and $D_6$. In fact, people's eyes cannot distinguish the small difference between the pixels $A_{11}$, $B_{11}$, $C_{11}$ and $D_{11}$ and original pixels A, B, C and D. By applying the above embedding method, as an example, to the pixels of the area to be embedded with a barcode, the image of the area can be restored when desired.

Figure 4:
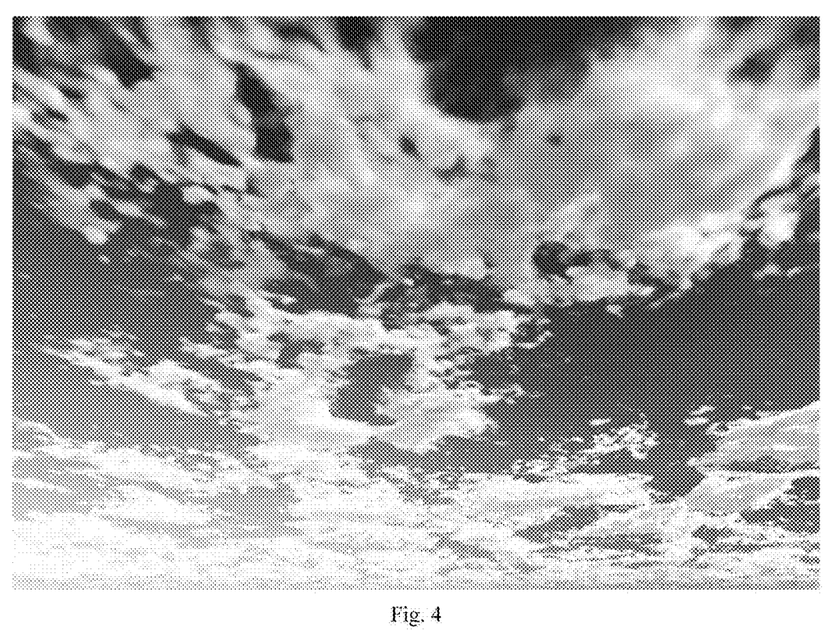
FIG. 4 is an example diagram illustrating an original image, in accordance with embodiments of the present disclosure.
Figure 5:
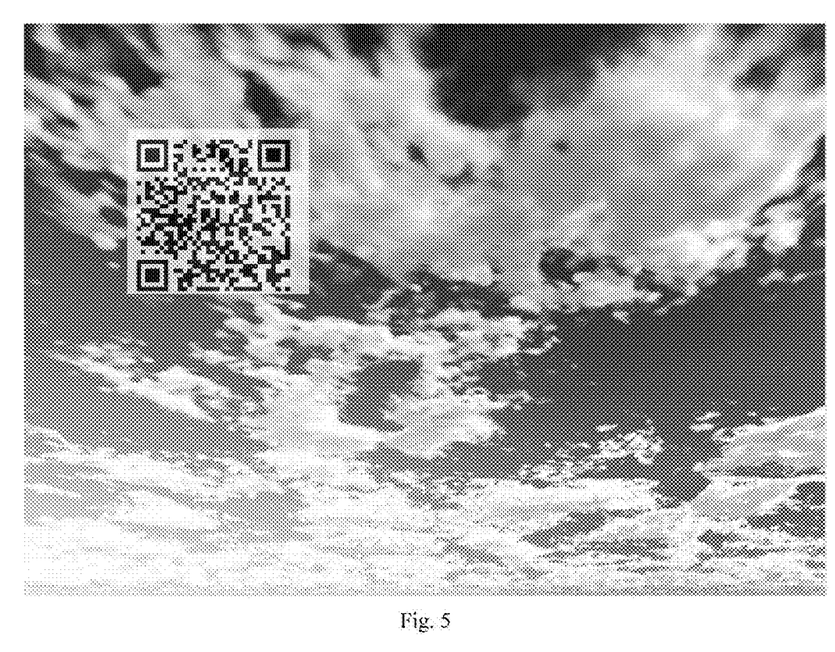
FIG. 5 is an example diagram illustrating a figure obtained after embedding a barcode into the image shown in FIG. 4, in accordance with embodiments of the present disclosure.
Figure 6:
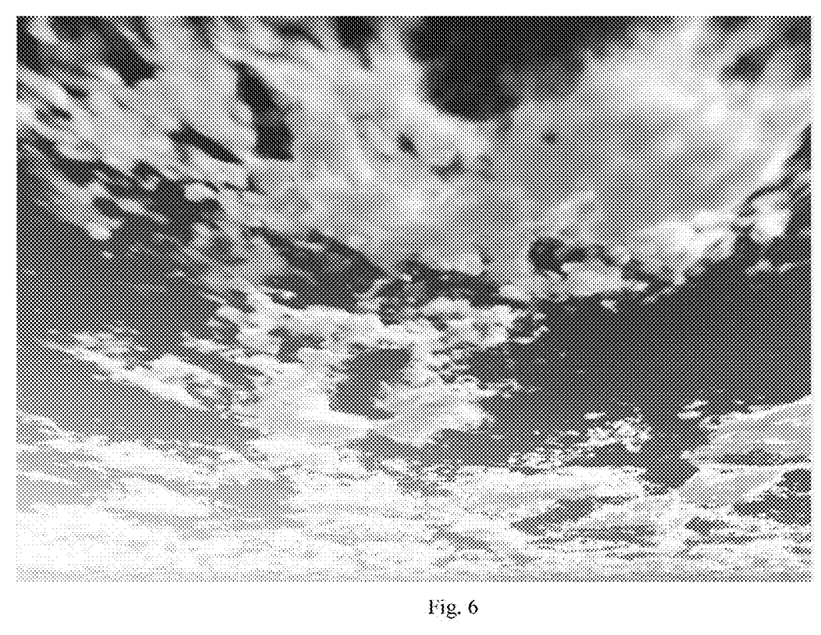
FIG. 6 is an example diagram illustrating a figure obtained after removing the barcode embedded in the image shown in FIG. 5, in accordance with embodiments of the present disclosure.

FIG. 4 is an example diagram illustrating an original image in accordance with embodiments of the present disclosure. FIG. 5 is an example diagram illustrating an image obtained after embedding a barcode into the image shown in FIG. 4, in accordance with embodiments of the present disclosure. FIG. 6 is an example diagram illustrating an image obtained after removing the barcode embedded in the image shown in FIG. 5, in accordance with embodiments of the present disclosure. It can be seen the image is almost the same as the original image shown in FIG. 4. There is no need to worry that an image can be destroyed by a barcode. The image can be restored well whenever necessary or desired, in accordance with embodiments of the present disclosure. Furthermore, aspects of the method provided by the present disclosure can be applied to any general image format.

As described herein, example embodiments of the present disclosure provide a method, a system and a computer program product for embedding a removable barcode into an image.

In an aspect, a computer-implemented method is provided. According to the method, a barcode-embedding area in an image can be acquired. Pixels in the barcode-embedding area from a RGB (Red, Green, Blue) color space can be changed to a color space with a luminance component. The luminance values of the pixels can be determined on a dark side or a light side. The luminance values of the pixels on the dark side or the light side can be mapped to the luminance values falling into the whole range of the luminance interval. The pixels in the barcode-embedding area can be changed from the color space with luminance component to the RGB color space.

In yet another aspect, a system for embedding a removable barcode on an image is provided. The system comprises a processor and a memory, the memory storing instructions to cause the processor to perform the following actions. The actions comprise of acquiring a barcode-embedding area in an image. The actions further comprise of changing pixels in the barcode-embedding area from a RGB color space to a color space with luminance component. The actions further comprise of determining the luminance values of the pixels are on a dark side or a light side. The actions further comprise of mapping the luminance values of the pixels on the dark side or the light side to the luminance values falling into the whole range of the luminance interval based on a mapping algorithm. The actions further comprise of changing the pixels in the barcode-embedding area from the color space with luminance component to the RGB color space.

In yet another aspect, a computer program product for embedding a removable barcode on an image is provided. The computer program product comprises a computer-readable storage medium having program instructions embodied thereon, the program instructions being executable by a computer to cause the computer to perform a method. The method comprises acquiring a barcode-embedding area in an image. The method further comprises changing pixels in the barcode-embedding area from a RGB color space to a color space with a luminance component. The method further comprises determining the luminance values of the pixels are on a dark side or a light side. The method further comprises mapping the luminance values of the pixels on the dark side or the light side to the luminance values falling into the whole range of the luminance interval. The method further comprises changing the pixels in the barcode-embedding area from the color space with luminance component to the RGB color space.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   acquiring a barcode-embedding area in an image, the barcode-embedding area in the image including a barcode that is embedded in the image and is removable; and
   removing the barcode embedded in the image, the removing the barcode comprising:
      changing pixels in the barcode-embedding area from a red, green, blue (RGB) color space to a color space with a luminance component;
      determining luminance values of the pixels to be in a dark side or a light side;
      mapping the luminance values of the pixels in the dark side or the light side to luminance values falling into a whole range of a luminance interval; and
      changing the pixels in the barcode-embedding area from the color space with the luminance component to the RGB color space.

2. The computer-implemented method of claim 1, further comprising embedding the barcode in the image, wherein the embedding the barcode in the image comprises:
   locating an area in the image to be embedded with the barcode;
   changing pixels in the area from the RGB color space to the color space with the luminance component;
   mapping luminance values of the pixels to the dark side or the light side of the luminance interval based on color information of the barcode corresponding to the pixels; and
   changing the pixels in the area from the color space with the luminance component to the RGB color space.

3. The computer-implemented method of claim 2, wherein the mapping the luminance values of the pixels to the dark side or the light side of the luminance interval based on color information of the barcode corresponding to the pixels further comprises:
   for each pixel in the area, based on a corresponding barcode pixel being black, mapping the luminance values of the pixel to the dark side of the luminance interval, and based on the corresponding barcode pixel being white, mapping the luminance values of the pixel to the light side of the luminance interval.

4. The computer-implemented method of claim 3, wherein the mapping the luminance values of the pixels to the dark side or the light side of the luminance interval further comprises based on a plurality of luminance values of the pixels being mapped to luminance values in the dark side or the light side of the luminance interval, differentiating the plurality of luminance values of the pixels by using correction codes.

5. The computer-implemented method of claim 4, wherein the mapping the luminance values of the pixels on the dark side or the light side to the luminance values falling into the whole range of the luminance interval further comprises revising the luminance values falling into the whole range of the luminance interval with the correction codes.

6. A system comprising:
   a memory; and a processor in communication with the memory, wherein the system is configured to perform a method, said method comprising:

acquiring a barcode-embedding area in an image, the barcode-embedding area in the image including a barcode that is embedded in the image and is removable; and removing the barcode embedded in the image, the removing the barcode comprising:

changing pixels in the barcode-embedding area from a red, green, blue (RGB) color space to a color space with a luminance component;

determining luminance values of the pixels to be in a dark side or a light side;

mapping the luminance values of the pixels in the dark side or the light side to luminance values falling into a whole range of a luminance interval; and changing the pixels in the barcode-embedding area from the color space with the luminance component to the RGB color space.

7. The system of claim 6, wherein the method further comprises embedding the barcode in the image, wherein the embedding the barcode in the image further comprises:

locating an area in the image to be embedded with the barcode;

changing pixels in the area from the RGB color space to the color space with the luminance component;

mapping luminance values of the pixels to the dark side or the light side of the luminance interval based on color information of the barcode corresponding to the pixels; and changing the pixels in the area from the color space with the luminance component to the RGB color space.

8. The system of claim 7, wherein the mapping the luminance values of the pixels to the dark side or the light side of the luminance interval based on color information of the barcode corresponding to the pixels further comprises:

for each pixel in the area, based on a corresponding barcode pixel being black, mapping the luminance values of the pixel to the dark side of the luminance interval, and based on the corresponding barcode pixel being white, mapping the luminance values of the pixel to the light side of the luminance interval.

9. The system of claim 8, wherein the mapping the luminance values of the pixels to the dark side or the light side of the luminance interval further comprises based on a plurality of luminance values of the pixels being mapped to luminance values in the dark side or the light side of the luminance interval, differentiating the plurality of luminance values of the pixels by using correction codes.

10. The system of claim 9, wherein the mapping the luminance values of the pixels on the dark side or the light side to the luminance values falling into the whole range of the luminance interval further comprises revising the luminance values falling into the whole range of the luminance interval with the correction codes.

11. A computer program product comprising:

a non-transitory computer-readable storage medium readable by a processing circuit and storing instructions for execution for performing a method, the method comprising:

acquiring a barcode-embedding area in an image, the barcode-embedding area in the image including a barcode that is embedded in the image and is removable; and removing the barcode embedded in the image, the removing the barcode comprising:

changing pixels in the barcode-embedding area from a red, green, blue (RGB) color space to a color space with a luminance component;

determining luminance values of the pixels to be in a dark side or a light side;

mapping the luminance values of the pixels in the dark side or the light side to luminance values falling into a whole range of a luminance interval; and changing the pixels in the barcode-embedding area from the color space with the luminance component to the RGB color space.

12. The computer program product of claim 11, wherein the method further comprises embedding the barcode in the image, wherein the embedding the barcode in the image comprises:

locating an area in the image to be embedded with the barcode;

changing pixels in the area from the RGB color space to the color space with the luminance component;

mapping luminance values of the pixels to the dark side or the light side of the luminance interval based on color information of the barcode corresponding to the pixels; and changing the pixels in the area from the color space with the luminance component to the RGB color space.

13. The computer program product of claim 12, wherein the mapping the luminance values of the pixels to the dark side or the light side of the luminance interval based on color information of the barcode corresponding to the pixels further comprises:

for each pixel in the area, based on a corresponding barcode pixel being black, mapping the luminance values of the pixel to the dark side of the luminance interval, and based on the corresponding barcode pixel being white, mapping the luminance values of the pixel to the light side of the luminance interval.

14. The computer program product of claim 13, wherein the mapping the luminance values of the pixels to the dark side or the light side of the luminance interval further comprises based on a plurality of luminance values of the pixels being mapped to luminance values in the dark side or the light side of the luminance interval, differentiating the plurality of luminance values of the pixels by using correction codes.

15. The computer program product of claim 14, wherein the mapping the luminance values of the pixels on the dark side or the light side to the luminance values falling into the whole range of the luminance interval further comprises revising the luminance values falling into the whole range of the luminance interval with the correction codes.

* * * * *